Nov. 15, 1966  J. E. GWYN  3,286,167
MONITORING OF HETEROGENEITY OF ALKYLATION EMULSIONS
Filed April 25, 1962  3 Sheets-Sheet 1

INVENTOR:
JOHN E. GWYN

BY: *John K. Uilkema*
HIS ATTORNEY

INVENTOR:
JOHN E. GWYN
BY: *John R. Wilhems*
HIS ATTORNEY

United States Patent Office 3,286,167
Patented Nov. 15, 1966

3,286,167
MONITORING OF HETEROGENEITY OF
ALKYLATION EMULSIONS
John E. Gwyn, Pasadena, Tex., assignor to Shell Oil Company, New York, N.Y., a corporation of Delaware
Filed Apr. 25, 1962, Ser. No. 190,158
6 Claims. (Cl. 324—30)

This invention is directed to a monitoring system and its application to the measurement and control of sulfuric acid alkylation processes and the emulsions used therein. More particularly, the invention is directed to a method of detecting the proportions and heterogeneity of the constituents present in emulsions used in the sulfuric alkylation process. As used herein, the heterogeneity of an emulsion in the sulfuric acid alkylation process represents the degree of intermixing of the acid continuous and unemulsified hydrocarbon or hydrocarbon continuous portions of the emulsion.

In sulfuric acid alkylation, the importance of the nature of acid-hydrocarbon dispersion has become apparent from the observation and study of plant and pilot plant data. It has been shown that the yield and selectivity of the alkylation process depends on sufficient mixing of the catalyst with the hydrocarbon. Specifically, improper mixing of the catalyst with the hydrocarbon is known to result in unreacted material and poor yield due to polymerization. Thus, it is believed apparent that a monitoring system to continuously detect emulsion properties is of particular importance in sulfuric acid alkylation processes. The use of such a system facilitates the prediction of relative alkylation plant performance under varying conditions.

It is recognized that the use of monitoring systems is not in itself new. However, presently available monitoring systems for use in fluid streams (as found in alkylation processes) make no adequate provision for the continuous detection of heterogeneity of constituents within the stream. The most obvious monitoring systems rely on removing and analyzing a sample from the stream being monitored. These systems have the disadvantage that they require interruption of the stream and are also impractical from the viewpoint of continuous monitoring. Furthermore, the removal and analysis of a sample gives little, if any, indication of the continuous heterogeneity of the stream, even if frequent and successive samples are taken.

In light of the disadvantages of sample removal systems, and the limited information available therefrom, monitoring systems utilizing probes inserted into fluid streams have been developed. For example, probing systems have been used to detect the temperature or the electrical properties of streams, such as the conductivity or dielectric constant thereof. Although these systems have proved effective indicators of certain physical characteristics of fluid streams, they have not been developed or utilized for the effective measurement and control of alkylation emulsions. The absence of probing systems from the alkylation control art is primarily the result of the insensitive nature of such systems in the measurement of high velocity streams having rapidly changing characteristics.

In view of the requirements for satisfactory monitoring of sulfuric acid alkylation process emulsions, the importance of the present invention is believed apparent. This importance is emphasized by the inadequacies and shortcomings of the presently available monitoring systems.

An object of the present invention is therefore to provide a method for continuousily monitoring flowing fluids.

Another object of the invention is to provide a method for continuously monitoring flowing fluids without interrupting the flow of the fluid.

A further object of the invention is to provide a method of monitoring a flowing fluid to determine the proportions of the constituents present therein and the heterogeneity of these constituents.

Yet another object of the invention is to provide a method of measuring the characteristics of sulfuric acid alkylation emulsions.

These and other objects of the invention will become apparent from the following description and accompanying illustrations.

In its broadest aspect, the present invention provides a method to continuously determine the proportions and heterogeneity of constituents present in flowing sulfuric acid alkylation emulsions used in the sulfuric acid alkylation process. The method comprises continuously sensing the relative proportions of the constituents present in the flowing emulsion and detecting variations in these relative proportions.

The invention will now be described with reference to the accompanying drawings, in which.

Figure 1:
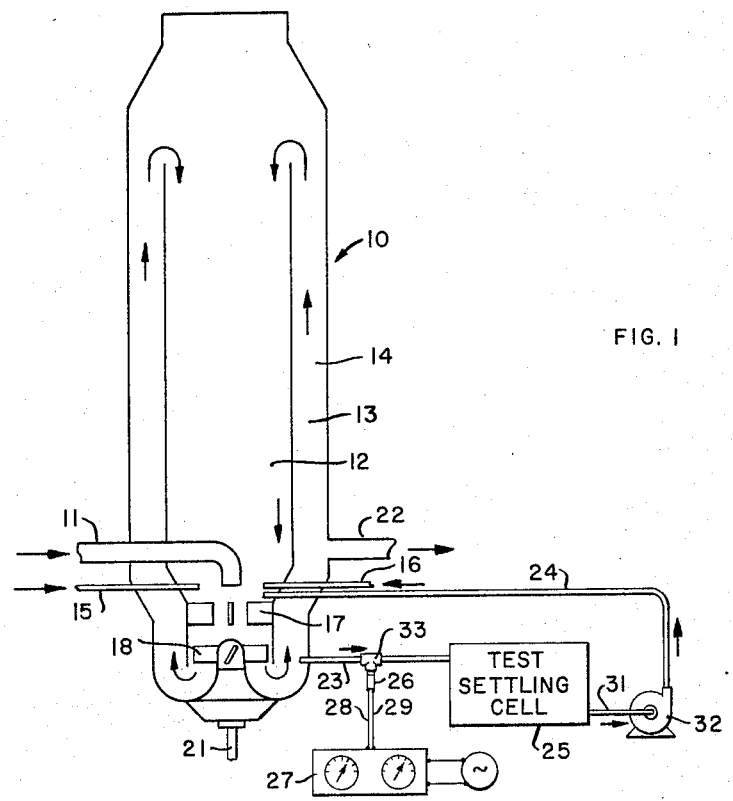
FIGURE 1 is a schematic view of an alkylation reactor diagrammatically illustrating an application of the system of the present invention.

In FIGURE 1, the numeral 10 designates a "Stratco" type alkylation reactor. The numeral 11 designates an acid inlet into the reactor. The inlet 11 extends through the wall of the reactor into the central section 12 thereof. A wall 13 separates the central section from an annular section from an annular section 14 disposed between the wall 13 and the outer wall of the reactor. Hydrocarbon inlet conduits 15 and 16 extend into the central section of the reactor at approximately the same level as the lower end of the acid inlet 11. Guide vanes 17 and an impeller 18 are positioned below the acid and hydrocarbon inlets and within the lower part of the central section 12. A drive shaft 21 extends through the bottom of the reactor into operative engagement with the impeller 18. An outlet 22 extends through the outer wall of the reactor into communication with the section 14.

The test circuit to which the system of the present invention may be applied comprises a high pressure sample tap or conduit 23 extending into the annular section 14 and a low pressure tap or conduit 24 extending into the central section 12. The conduit 23 extends from the reactor to a test settling cell 25. A test probe 26 is secured to the conduit 23 intermediate the ends thereof and extends into communication with fluid flowing through the conduit. The probe 26 is connected to an electrical indicating device 27 through electrical lines 28 and 29. The probe 26 and indicating device 27 will be described in detail subsequently. The test settling cell 25 communicates with the low pressure conduit 24 through a conduit 31 and a pump 32.

The illustration of the reactor and the testing circuit used in combination therewith is merely intended to be diagrammatic. The arrows shown throughout the illustration indicate the direction of flow therein. In operation, acid and hydrocarbon are introduced into the reactor through the inlets 11, 15 and 16. Upon entering the reactor, the acid and hydrocarbon are pulled through the vanes 17 by the impeller 18 and are forced through the annular section 14. The circulation induced by the impeller 18 acts to produce an emulsion of acid and hydrocarbon, thereby facilitating effective use of the acid catalyst. The emulsion leaves the reactor and passes to subsequent alkylation stages through the outlet 22. The characteristics of the emulsion in the reactor are continuously monitored by the removal of a sample of the emulsion from the reactor through the taps 23 and 24. From the arrows in the drawing, it can be seen that the sample leaves the reactor through the tap 23 and is returned to the reactor through the tap 24. The probe 26 and sampling cell 25 are used to determine the characteristics of the sample removed from the reactor, as will be described subsequently. The pump 32, together with the pressure differential between the taps 23 and 24, acts to induce fluid flow within the sample line circuit.

Figure 3:
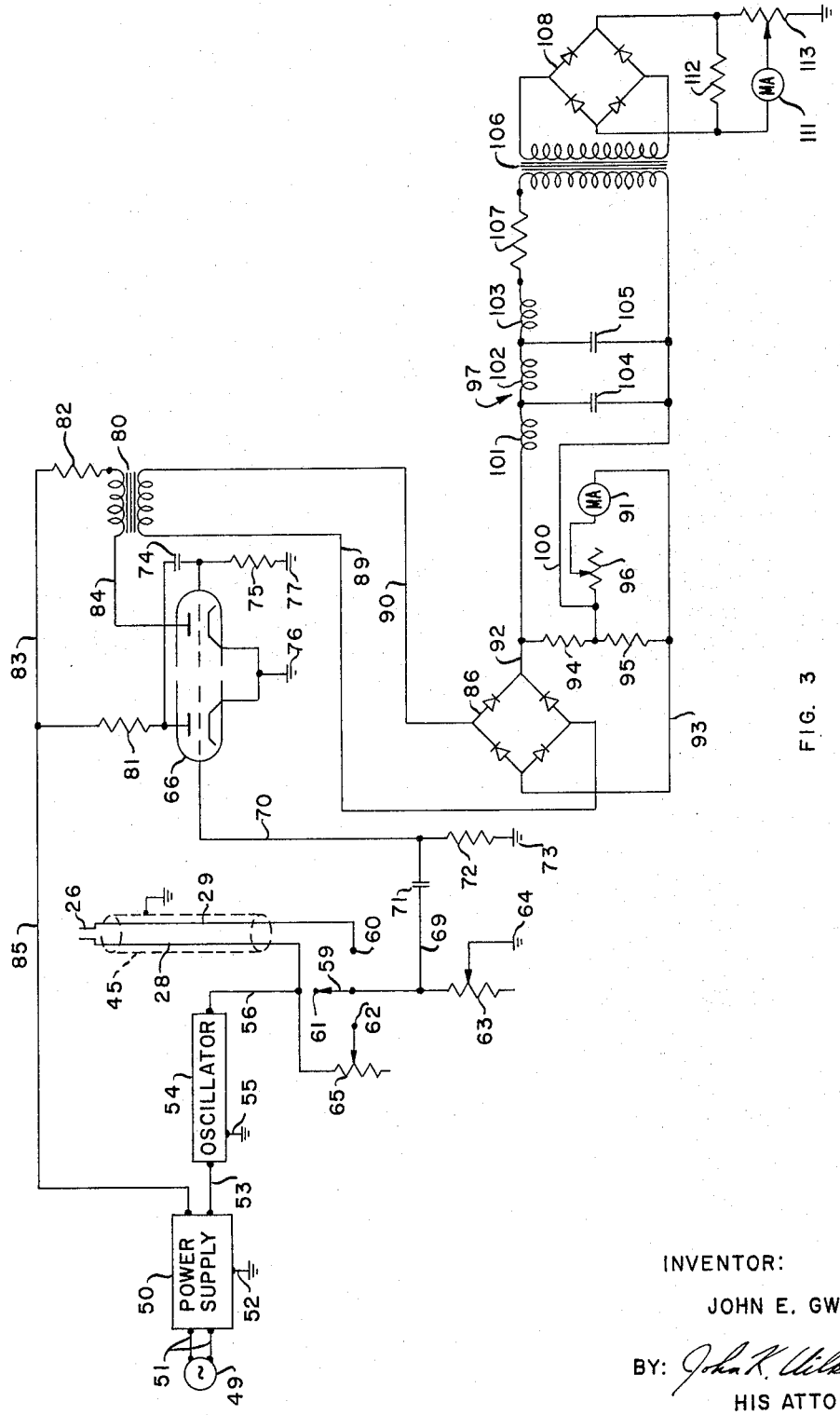
FIGURE 3 illustrates an electrical indicating device designed to carry out the method of the present invention. The device is shown both diagrammatically and schematically with conventional components being designated by block diagrams.

The test circuit illustrated in FIGURE 3 is merely intended to be exemplary of a form that may be used with the method of the invention. It is to be understood that the inventive method is not limited to use with this circuit. For example, it is anticipated that the probe could be inserted directly into the reactor through a sample tap and packing gland.

Figure 2:
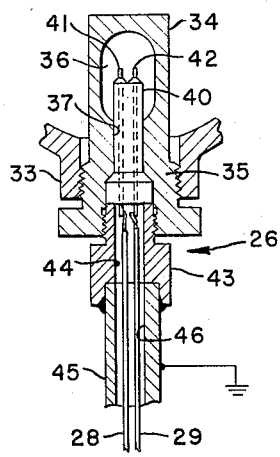
FIGURE 2 is a vertical section of a probe suitable for use in the system illustrated in FIGURE 1.

FIGURE 2 illustrates a preferred form of probe 26 to be used in the test circuit shown in FIGURE 1. This probe is designed to produce reliable results when used in combination with the electrical indicating device 27 and to resist physical damage when used in communication with an acid emulsion as employed in alkylation processes. In FIGURE 2, the probe is shown extending into the conduit 23 illustrated in FIGURE 1. Conduit 23 is provided with a threaded coupling 33 adapted to receive the probe member. The probe includes an electrode shield 34 having a threaded section 35 integral therewith and adapted to be threaded into the coupling 33 on the conduit 23. The shield 34 has a slot 36 extending therethrough in alignment with the axis of the conduit 23. A passage 37 having a narrow upper section, tapered intermediate section, and a threaded lower section, extends between the slot 36 and the end of the shield 34 extending to the exterior of the conduit 23. A wear-resistant electrical insulator 40, such as Teflon, having electrodes 41 and 42 extending therethrough is seated in the passage 37 so as to position the electrodes in approximately the center of the slot 36. In addition to being wear resistant, the material of the insulator 40 has the property of not being wetted by the conductive acid phase of fluid flowing through the conduit 23. The latter characteristic assures that the sensing characteristics of the probe will not be adversely effected by fluid lingering thereon. Through this arrangement, the electrodes 41 and 42 are continuously exposed to fluid flowing through the conduit 23 with a minimum of disturbance to the fluid flow.

A plug 43 having an axial passage 44 extending therethrough is threaded into the lower end of the passage 37. The plug is adapted to engage the lower end of the insulator 40 and force it into sealing engagement with the tapered surface of the intermediate section of the passage 37. Thus, the parts of the probe disposed on the interior of the conduit 23 are effectively isolated and sealed from those disposed to the exterior of the conduit. The passage 44 extending through the plug 43 provides a conduit for the leads 28 and 29 secured to the lower ends of the electrodes 41 and 42, respectively. A grounded shield 45 having a passage 46 extending therethrough secured to the outwardly extending end of the plug 43.

The electrical indicating device designed to be used in combination with the test circuit of FIGURE 1 and the probe of FIGURE 2 is illustrated in FIGURE 3. This device is adapted to continuously indicate the conductivity and variances in the conductivity of fluid passing between the electrodes 41 and 42. The conductivity and variances sensed by the device serve as indications of the proportions and heterogeneity, respectively, of the constituents present in the fluid. It is noted that the conductivity of a fluid stream is directly related to the proportions of the constituents present in the stream. For example, in a sulfuric acid alkylation process, as shown in part in FIGURE 1, the stream flowing through the conduits 22 and 24 is known to be an emulsion of sulfuric acid and hydrocarbons. Since the hydrocarbon constituent is essentially nonconductive and the sulfuric acid constituent is conductive, the conductivity of the stream serves as an accurate indication of the proportions of the constituents present therein. In addition, sudden variations in the conductivity of such a stream serve as indications of the heterogeneity of the constituents present therein. The details of the construction and application of the indicating device will now be developed with reference to FIGURES 3 and 4.

The device schematically illustrated in FIGURE 3 derives its operating power from an input source 49, such as the conventional 115 volt, 60 cycle supply of most power companies. The input source 49 is connected to a power supply 50 through lines 51. The power supply is grounded as indicated at 52. A line 53 connects the power supply 50 with an oscillator 54 adapted to supply a 10 kilocycle low voltage signal. The oscillator is grounded as indicated at 55.

A first meter circuit is connected to the oscillator 54 through a line 56. This circuit is adapted to continuously indicate the conductivity of fluid passing between the electrodes 41 and 42 of the proble 26. The circuit includes the probe 26 connected in series with the oscillator 54 through the line 56. The grounded shielding 45 is indicated by the dotted lines extending around the leads 28 and 29 to probe 26. A switch 59, having three alternative positions 60, 61, and 62, is adapted to complete the series circuit through the probe 26. It is noted that in the illustration, the switch 59 is disposed at the neutral position 61 and the series circuit between the oscillator in the probe is broken. The probe is connected to balance the first meter circuit by turning the switch to the position 60. An adjustable meter resistance 63, having a relatively small resistance compared to that offered to the circuit by the probe 26, is disposed between the central pole of the switch 59 and the ground 64 to provide a signal from the probe having an amplitude that varies inversely with the resistance offered by the probe 26. When the switch 59 is turned to the position 62, the oscillator is connected in series with an adjustable calibrating resistance 65 rather than the probe 26. The switch position 62 and the adjustable resistance 65 are provided to accurately calibrate the meter 91 used in combination with probe to indicate the conductivity of the emulsion.

An amplifier 66 is capacitance-resistance coupled to the probe 26 through lines 69 and 70, the capacitance 71 and resistance 72. The line 70 is grounded at 73 through the resistor 72. The amplified 66 includes two stages capacitance-resistance coupled as shown at 74 and 75, respectively. The cathodes of the amplifier are grounded at 76 and the resistance 75 is grounded at 77. The plate in the first stage of the amplifier is connected to a power supply 50 through a resistance 81 and a line 85. An isolating transformer 80 is connected to the power supply 50 through a resistance 82 interposed between the line 83 and one side of the transformer and a line 85 extending between the line 83 and the power supply. The plate of the second stage of the amplifier 66 is connected tto the isolating transformer 80 through line 84.

The output side of the isolating transformer 80 is connected to the opposite sides of a full-wave rectifying bridge 86 through lines 89 and 90. The rectifying bridge 86 is in turn connected to a milliammeter 91. The connection between the rectifying bridge 86 and the milliammeter 91 includes lines 92 and 93, fixed resistances 94, 95, and variable resistance 96.

Through the above-described first meter circuit, the signal from the probe 26 is amplified and rectified to provide a D.C. signal which indicates the current passing between the electrodes of the probe 26. The indication of the signal is displayed on the milliammeter 91. Thus, if the probe 26 is inserted into a fluid stream having constituents, such as hydrocarbon and sulfuric acid as found in the emulsion of alkylation processes, the percent of each of these constituents may be directly related to the reading on the milliammeter 91.

After passing through the first meter circuit, the signal from the probe 26 is conveyed to a second meter circuit through a low pass filter 97. The filter 97 is connected to the first meter circuit through the line 92 and a line 100 connected intermediate of the resistors 94, 95 and 96. The filter 97 includes inductors 101, 102 and 103 connected in series and capacitors 104 and 105 connected in parallel. This filter does not pass the 10 kilocycle carrier frequency and therefore removes the ripple voltages caused by the relatively high 10 kilocycle signal from the rectified output signal of the probe 26.

The filter 97 is connected to one side of an isolating transformer 106 through line 100 and a resistor 107. The other side of the transformer 106 is connected to the opposite sides of a full-wave rectifying bridge 108. A root-mean-square milliammeter 111 is connected to the rectifying bridge 108 in parallel with a resistance 112 and in series with an adjustable grounded resistance 113. It is noted that the coupling arrangement between the filter 97 and the milliammeter 111 corresponds to that between the amplifier 66 and the milliammeter 91.

Through use of the second meter circuit, the probe 26 may be used to detect the heterogeneity of the constituents in a fluid flowing through a stream. The output voltage wave of a rectifier is conventionally considered as consisting of a D.C. component upon which are superimposed A.C. voltages, termed ripple voltages, which have an amplitude and frequency directly related to the input signal to the rectifier. Additionally, the output signal from the rectifier 86 contains another A.C. component superimposed upon the D.C. level which corresponds to the modulation of the oscillator output signal due to the changes in conductivity of the stream. This additional A.C. component appears as noise on the final output signal from the rectifier 86 and constitutes the envelope thereof. The low pass filter 97 removes the A.C. components or ripple voltages in the output signal from the rectified 86 due to the 10 kilocycle carrier frequency but passes the envelope or "noise" signal due to variations in the conductivity of the stream being sampled. The transformer 106 removes the D.C. component from the output signal of the filter 97 and effectively isolates the A.C. ("noise") component from the D.C. percent acid component (conductivity component). The A.C. (noise) output signal from the transformer 106 is then rectified by the rectifier 108 and passed to the meter 111 to indicate the "noise" level, which in turn is directly related to the heterogeneity of the stream into which the probe is inserted. The relationship of the "noise" level to heterogeneity will be developed more completely subsequently. The use of the root-mean-square milliammeter 111 emphasizes changes in the signal received thereby and thus facilitates easy reading of the signal indicated on the meter.

Figure 4:
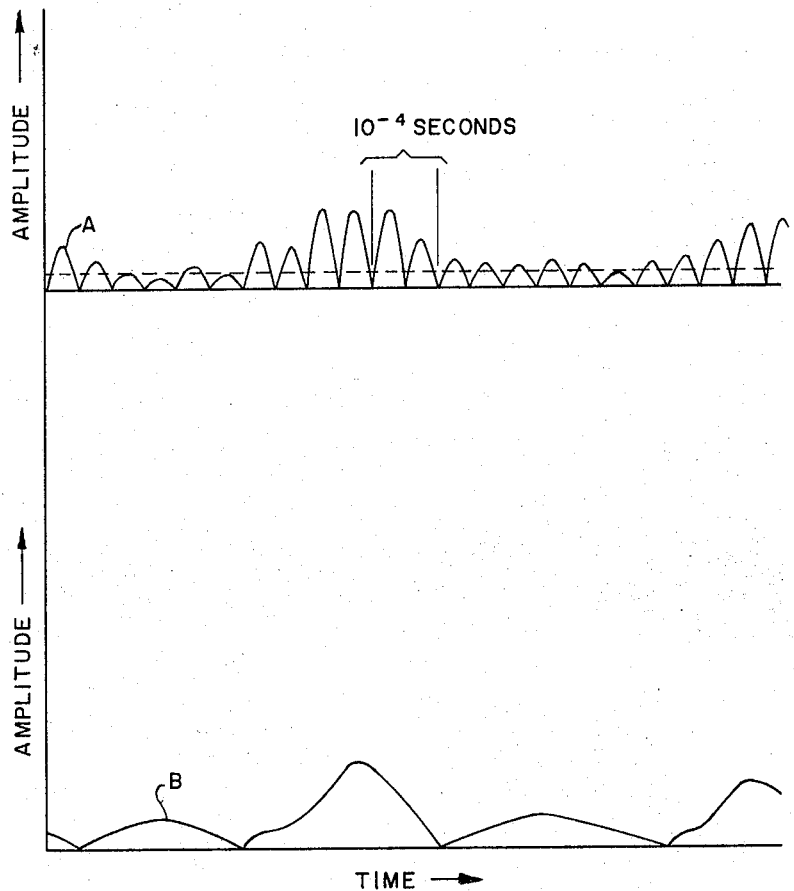
FIGURE 4 illustrates curves representing the variables received by the indicating device of FIGURE 3.

The curves shown in FIGURE 4 are illustrative of the types of signals received by the milliammeters of the first and second circuit. Curve A shows the signal received by the meter 91 from the probe during a period in which the probe is inserted in a fluid stream of varying conductivity. The 10 kilocycle oscillator frequency and the effect of the full-wave rectifier 86 are apparent from the curve, i.e., a resulting 20 kilocycle pulsating D.C. signal. The varying amplitude of curve A is the result of changes in the conductivity of the fluid flowing between the electrodes 41 and 42 of the probe 26. Although the solid line curve indicated in curve A represents the signal received by the milliammeter 91, it is to be understood that high frequency of the signal makes the accurate indication thereof on the milliammeter 91 impossible. For this reason, the reading of the milliammeter 91 more closely represents an average of the signal received thereby rather than an actual indication of the signal. The dashed line extending through curve A represents the average signal indicated on the milliammeter 91. Thus, it can be seen that although the milliammeter 91 gives an indication of the average conductivity of the fluid stream, it does not reliably indicate sudden variances in the conductivity. It is noted, as explained supra, that the conductivity of the stream passing between the electrodes of the probe 26 is an accurate indication of the constituents present in the stream. Therefore, it is apparent that variances in the conductivity represent variances in the proportions of the stream constituents. These variances, in turn, indicate the uniformity or heterogeneity of the constituents in the stream.

In light of the above discussion of curve A and the indications received by milliammeter 91, the value of a system to indicate the variations (e.g., noise or envelope) in the curve A is believed apparent. Such an indication would serve as an accurate means of sensing the uniformity or heterogeneity of the stream passing between the electrodes of the probe 26. The second meter circuit is designed to detect this "noise" or envelope and thereby indicate heterogeneity or uniformity of the stream.

Curve B of FIGURE 4 represents the signal received by the milliammeter 111 of the second meter circuit. Curves A and B of FIGURE 4 are plotted on the same time scale. Curve B shows that the ripple voltages caused by the 10 kilocycle signal from the oscillator 54 have been removed from the output signal of the rectifier 86. In addition, curve B shows the effect of the isolation of the A.C. component from the D.C. component by the transformer 106 and the effect of rectification by the rectifier 108. The amplitude of curve B is emphasized by the use of the root-mean-square milliammeter 111. Thus, the relatively low frequency and high amplitude of the signal shown by curve B is readily detected by the root-mean-square milliammeter 111 and serves as an accurate indication of the heterogeneity of the fluid stream passing between the electrodes of the probe 26.

The system of the present invention will now be summarized with respect to the reactor and sampling arrangement shown in FIGURE 1 and the electrical indicating device shown in FIGURE 3. The probe 26 is inserted into the sample tap or conduit 23 as illustrated in FIGURE 1. The probe is then coupled to the electrical detecting device of FIGURE 3. In the detecting device, the signal from the probe is amplified and rectified to provide a D.C. signal for the milliammeter 91, which signal indicates the percent of acid in the emulsion stream flowing through the conduit 23. It is noted that the acid constituent in the emulsion is highly conductive whereas the hydrocarbon constituent therein is essentially nonconductive. Therefore, the amplified and rectified signal read on the milliammeter 91 has a direct relationship to the proportions of the constituents present in the emulsion flowing through the conduit 23. This relationship can be readily calibrated by comparing the milliammeter readings with the properties of the fluid determined through measurements or analysis of the sample in the test settling cell 25. Once the metering system has been calibrated, further determination through use of the settling cell 25 may be omitted. In order to determine the heterogeneity of the emulsion flowing through the conduit 23, the signal from the probe 26 is passed through the second meter circuit, as previously described and shown in FIGURE 3. In this circuit, the signal is passed through a filter 97 to remove the ripple voltages caused by the 10 kilocycle signal from the oscillator 54. The purpose of the filter is to remove the A.C. components due to the oscillator signal while preserving the fluctuation of the probe signal due to changes in the conductivity of this stream. After passing through the filter, the signal is passed through an isolating transformer 106 to isolate the A.C. ("noise") from the D.C. conductivity or percent acid component therein. After passing through the transformer 108 the signal is rectified and read on the root-mean-square milliammeter 111 to indicate the heterogeneity of the stream. It is noted that in essence the second meter circuit acts to isolate the noise or heterogeneity component of the probe signal from the conductivity or constituent proportion component of the signal.

The foregoing description of the invention is merely intended to be explanatory thereof. Various changes in the details of the described method may be made, within the scope of the appended claims, without departing from the spirit of the invention.

I claim as my invention:

1. A method for monitoring the heterogeneity of an alkylation emulsion stream, comprising the steps of:
   continuously passing an alternating electrical current through a portion of said stream;
   detecting said electrical current and producing an electrical signal proportional thereto;
   filtering said electrical signal to remove those alternating current components thereof caused by said alternating electrical current while retaining those alternating current components caused by changes in the conductivity of the stream;
   and detecting and displaying said retained alternating current components in the filtered signal to indicate the heterogeneity of the stream.

2. A method for monitoring the proportions and the heterogeneity of the constituents in an alkylation emulsion stream, comprising the steps of:
   continuously passing an alternating electrical current signal through a portion of the stream;
   detecting said signal;
   measuring and displaying the average magnitude of the detected signal to indicate the proportions of the constituents in the stream;
   filtering said detected signal to remove the alternating current components thereof induced by said alternating electrical current signal while retaining those alternating current components induced by changes in the conductivity of the stream; and
   detecting and displaying said retained alternating current components to indicate the heterogeneity of the constitutents in the stream.

3. A method of monitoring the heterogeneity of the emulsion in an alkylation reactor, comprising the steps of:
   tapping a portion of the emulsion in the reactor to produce an emulsion stream;
   continuously passing an alternating electrical current signal through said tapped portion of the emulsion;
   detecting the signal passing through said tapped portion of the emulsion;
   filtering said detected signal to remove the alternating current components thereof due to said alternating electrical current signal while retaining those alternating current components due to changes in the conductivity of the emulsion;
   and detecting said retained alternating current components as an indication of the heterogeneity of the emulsion.

4. A method of monitoring the heterogeneity of an alkylation emulsion stream comprising the steps of:
   continuously passing an alternating electrical current signal through a portion of the stream;
   detecting the signal passing through said portion of the stream;
   passing said detected signal through a full wave rectifier;
   filtering said rectified signal to remove all frequency components thereof caused by said alternating electrical current signal while passing the envelope of said rectified signal;
   and detecting the envelope of said filtered signal as an indication of the heterogeneity of said emulsion stream.

5. The method of claim 4 wherein said step of detecting the envelope of said filtered signal comprises:
   removing the D.C. component from said filtered signal and rectifying the resulting signal.

6. A method for monitoring the heterogeneity of an alkylation emulsion stream comprising the steps of:
   continuously passing an alternating electrical current signal through a portion of said stream;
   detecting the signal passing through said portion of the stream;
   passing said detected signal through a full wave rectifier;
   passing said rectified signal through a low pass filter to remove the frequency components thereof due to said alternating electrical current signal while passing the envelope of said rectified signal;
   passing said filtered signal through a transformer to remove D.C. components thereof;
   and measuring the output signal from the transformer as an indication of the heterogeneity of said emulsion stream.

References Cited by the Examiner

UNITED STATES PATENTS

| | | | |
|---|---|---|---|
| 2,379,897 | 7/1945 | Floyd | 330—10 |
| 2,390,409 | 12/1945 | Aiken | 324—30 X |
| 2,507,645 | 5/1950 | Price | 324—30 |
| 2,592,063 | 4/1952 | Persyn | 23—253 |
| 2,627,539 | 2/1953 | Tompkins | 324—118 X |
| 2,651,751 | 9/1953 | Heath | 324—30 |
| 2,656,508 | 10/1953 | Coulter. | |
| 2,897,436 | 7/1959 | Douty | 324—30 |
| 3,086,169 | 4/1963 | Eynon | 324—62 X |

WALTER L. CARLSON, *Primary Examiner.*

FREDERICK M. STRADER, *Examiner.*

C. F. ROBERTS, *Assistant Examiner.*